Feb. 17, 1970  P. B. HOOPER ET AL  3,495,912
STRAIN BIREFRINGENCE MODULATOR AND APPLICATION
Filed Nov. 17, 1966  2 Sheets-Sheet 1

PAIGE B. HOOPER
JACK J. DUFFIELD
ALFRED D. ROBINSON
INVENTORS.

BY White & Haefliger
ATTORNEYS.

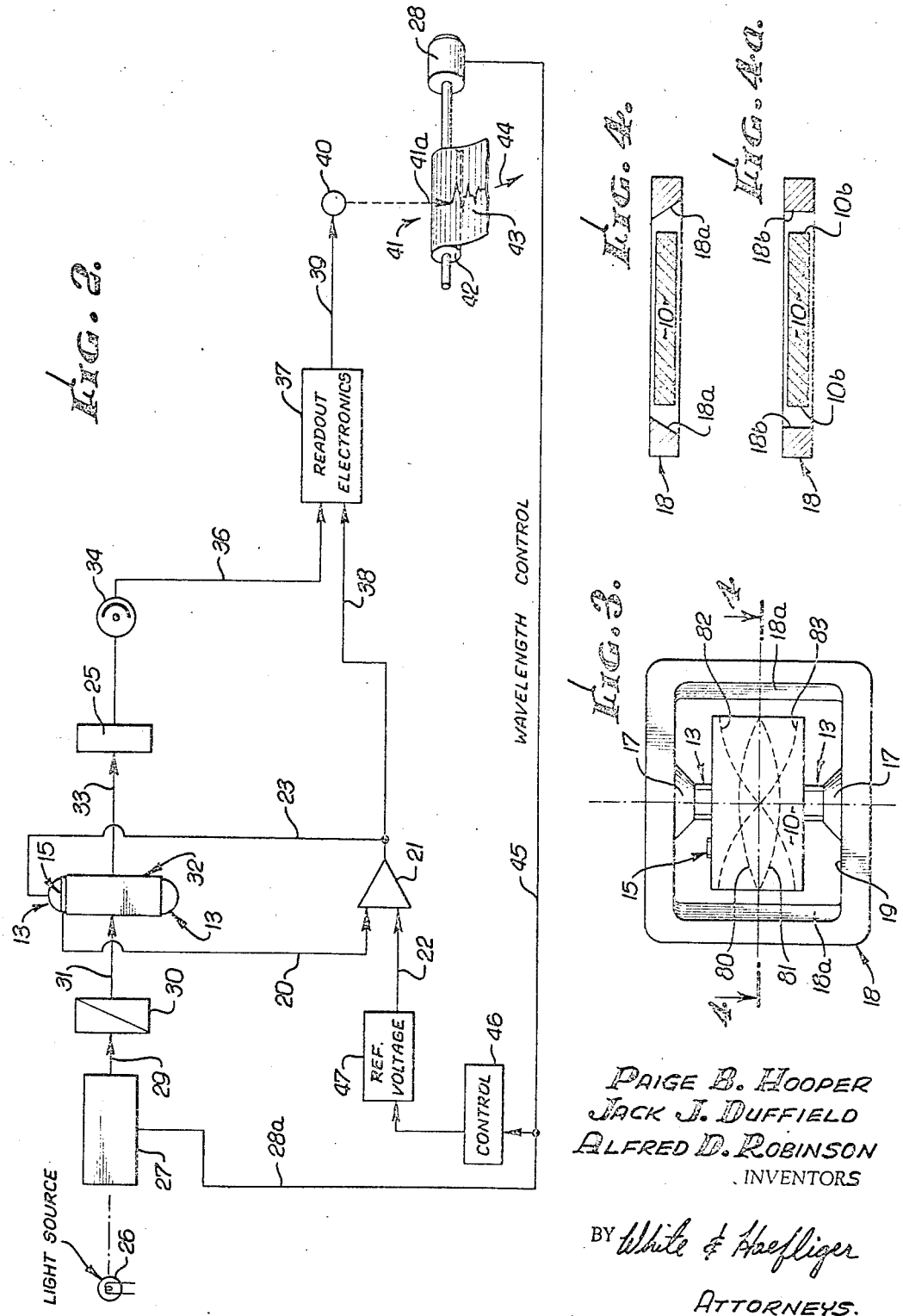

United States Patent Office 3,495,912
Patented Feb. 17, 1970

3,495,912
STRAIN BIREFRINGENCE MODULATOR AND APPLICATION
Paige B. Hooper, Glendora, Jack J. Duffield, Monrovia, and Alfred D. Robinson, El Monte, Calif., assignors to Cary Instruments, Monrovia, Calif., a corporation of California
Filed Nov. 17, 1966, Ser. No. 595,194
Int. Cl. G01n *21/40;* G02f *1/22*
U.S. Cl. 356—114
21 Claims

ABSTRACT OF THE DISCLOSURE

The invention concerns a strain birefringence modulator that comprises a body characterized as becoming optically plane birefringent under mechanical stress, and driver structure connected to transmit mechanical oscillations to effect body vibration at natural frequency, so that the body is made cyclically plane birefringent. A control is made responsive to body vibration and operates to control the driver structure so as to maintain substantially constant the relative retardation introduced by the modulator, independently of optical wavelength. The modulator is useful in apparatus for measuring circular dichroism of samples.

---

The invention relates generally to instrumentation for use in making measurements with polarized light. More specificaly, the invention concerns a novel strain birefringence modulator as well as instrumentation involving the use of same.

The interaction of light with matter may result in modifications to the character of the light acording to one or more of the following effects.

(1) Absorption: a reduction of the intensity of the radiation, resulting in energy dissipation into the matter.

(2) Refraction and dispersion: a change in the speed of the radiation through the material, this change being dependent on the wavelength or frequency of the radiation.

(3) Plane dichroism: preferential absorption of that part of the incident light which enters polarized parallel to a fixed direction within the material—resulting in a net linearly polarized component upon emergence.

or, presupposing that the incident radiation is linearly polarized, (4) Circular birefringence, or "optical rotation": a change in azimuthal angle;

(5) Circular dichroism: introduction of elliptical polarization;

(6) Plane birefringence: generation of elliptical polarization, and in general a rotation of the major axis of ellipticity about the optical path.

Circular birefringence and circular dichroism are closely related to ordinary absorption and refraction: the difference in absorption coefficients of a medium for left and right circularly polarized light constitutes circular dichroism; while the difference in the refractive indices of the medium for the two circular polarizations constitutes circular birefringence, which produces optical rotation.

Circular dichroism may be measured in several ways, including (1) directing plane-polarized light into a specimen, and measuring the ellipticity of the emergent light; or (2) directing alternately left- and right-circularly polarized light into the specimen and measuring the relative amounts of absorption, by the specimen, of the two circular components of opposite sense. In one advantageous adaptation of the latter system, the beam of light directed into the specimen has periodically varying ellipticity, varying symmetrically about zero ellipticity. Greater and lesser ellipticities correspond, respectively, to greater and lesser component amounts of circularly polarized light, while the change in algebraic sign of ellipticity corresponds to a reversal of sense of the circularly polarized component.

Plane birefringence, in media of well-known characteristics, may be used to produce such periodically varying ellipticities, to expedite investigation of circular dichroism, in materials of relatively unknown characteristcs. Plane brefringence, for purposes of the present discussion may be regarded as a three-step interaction between light and matter, wherein:

(a) Linearly-polarized light is resolved into two inphase orthogonally linearly-polarized components, one polarized parallel to a fixed direction within the medium, and the other component polarized perpendicularly to the first;

(b) The two orthogonally polarized components pass through the medium with different indices of refraction, i.e., different speeds, and thus are said to undergo a relative retardation;

(c) Upon emergence from the medium, the two unequally retarded compenents, now out of phase with each other, recombine to produce a resultant vector whose tip (projected on a plane normal to the direction of propagation) describes an ellipse—whence the term "elliptical polarization."

The resulting elliptical polarization possesses an ellipticity defined as the angle whose tangent is the ratio of minor to major axes of the projected ellipse. An ellipticity of $+45°$ corresponds to right circularly polarized light, while an ellipticity of $-45°$ corresponds to left circularly polarized light; ellipticity of zero corresponds to linearly polarized light.

Naturally plane-birefringent materials produce ellipticities which are constant in time, when the characteristics of the incident plane polarized beam are constant in time. However, time-varying plane birefringence may be induced in some materials, in such a way as to produce emergent light of varying ellipticity, including the requisite change in sign, for the measurement scheme outlned above. It is essential that a constant azimuthal angle be maintained between the polarization direction of the incident light and the induced "fixed direction" of the medium (referred to under *a* above).

Plane birefringence may be induced in some media by application, to such media, of electrostatic fields parallel to the optical path, or by mechanical stress, among other means.

The production of elliptically polarized light by the use of plane birefringence requires an input of linearly polarized light. Since ordinary light sources produce light beams which are in general unpolarized, the linearly polarized light required for use in the measurement of circular dichroism and other effects may be generated by polarizers of the plane dichoric type (e.g., commercial Polaroid shets), the plane bireringent type (e.g., Nicol prisms), or the reflection type (e.g., pile-of-plates).

Prior devices have been developed to generate cyclically varying relative retardation, and thus cyclically varying ellipticity (i.e., modulated retardation and ellipticity). These devices have typically incorporated apertured opague electrodes mounted on the light-transmitted, opposing, surfaces of an "electro-optic" crystalline plate such that when variable voltages are applied to such crystals via the electrodes, the phenomenon of variable birefringence is induced in the crystal. Such devices exhibit a number of disadvantages: the useful aperture is necessarily reduced to the area of the crystal surface not covered by the electroding; the electric field through the electrode-free spacings, caused by fringing of the field between electrodes, results in non-uniform plane birefringence across the aperture; and high voltages required for operation at long wavelengths produce corona discharges, resulting in reduced life of the device. In an effort to alleviate the non-uniform retardation, transparent electrodes consisting of glass or silica plates with a thin conductive layer have been applied to the light-passing surfaces of such crystals; however they subject the crystals to undersirable stresses and their usefullness is ultimately limited by problems of electrolysis.

A more important limitation of such devices as modulators is optical. Though they work well for normally incident rays (i.e., rays which are incident on the modulator surfaces along paths perpendicular to such surfaces) these modulators introduce substantial "errors" in retardation for rays which are obliquely incident. These substantial departures from uniform retardation for rays of different angles of incidence result in non-uniform ellipticity in the emerging beam; the net quantity of circularly polarized light of a given sense is thus not constant throughout the beam. This introduces direct errors into the measurement of circular dichroism using such imperfectly polarized beams. As an example, if such a modulator made from a 1.0 mm. thick crystal of ammonium dihydrogen phosphate is subjected to an exciting voltage of such magnitude as to induce ¼ wave (i.e., 90°) retardation to rays normally-incident on the modulator surface, then a ray incident upon that surface, then a ray incident upon that surface at an angle of only about 4° with the normal may have any retardation between zero and 90°, depending upon its orientation relative to the crystallographic and induced axes in the modulator. See in this regard, "Analytical Chemistry," vol. 38, pp. 30A–44A, June 1966.

Other systems which are known in the prior art for producing controllable elipticity in polarized light beams have been described in articles by Ennos in Optica Acta, vol. 10 No. 2, p. 105 (1963), and in J. Sci. Instrum. vol. 40, pp. 316–317 (1963), and also by Hauser, et al., in Applied Optics, vol. 2 No. 11, pp. 1175–1170 (1963). These are mechanical systems wherein stress is applied to a medium mechanically for the purpose of making it plane birefringent. These systems have the disadvantages of awkwardness, certain operational inconveniences and in one case, considerable expense. These systems consist in essence of mechanical means for contorting by brute force the medium to be made plane birefringent. As it is necessary for the strain pattern in these materials to undergo cyclical variations, to use these devices as modulators, these mechanical systems as embodied in modulators must be elaborate and capable of developing large variable forces. These disadvantages, as well as those disadvantages attributed to the electrically energized modulator described in prior paragraphs, have been obviated in the present invention.

Generally speaking, the plane birefringence of the present modulator is readily made variable, as for example essentially sinusoidal or cyclical in time; it may be used with other elements for measuring plane and circular dichroism, as well as plane and circular birefringence; and it may be used in simple light beam intensity modulation. Basically, the variable-birefringence device comprises a body characterized as becoming optically plane birefringent (i.e. exhibiting two principle indices of refraction for light beams polarized parallel and perpendicular to a fixed direction within the body) under mechanical stress, and driver structure connected in mechanical oscillation transmitting relation to the body to effect body vibration at a natural frequency of the body whereby the body is made cyclically plane birefringement. As will be seen, feedback may be provided is response to body vibration for controlling the driver structure to maintain the body in self-resonant vibration at natural frequency. Typically, the body comprises a plate oriented so that radiation is incident on a major face thereof, the drive structure being located proximate the plate periphery out of the radiation path. The drive structure may for example comprise piezoelectric drivers attached to the plate at nodal points mid-way between plate ends, or electromagnetic drivers located at plate opposite ends.

Advantages of the modulator device include low sensitivity to beam divergence, a wider range of permissible materials of construction so that light wavelength restrictions are much less severe while elements of greater mechanical strength may be employed, and the lack of need for light-transmissive electrically conducting electrodes.

Further objects of the invention include the provision of a frame supporting the modulator plate for vibration and having a surface or surfaces exposed to reflect away from the plate acoustic energy transmitted toward the frame surface by the plate; the provision of control means responsive to plate vibration to transmit electrical oscillations to the driver structure so as to maintain substantially constant the relative retardation (measured in waves) introduced by the modulator, independently of optical wavelength; and the provision of means in combination with the modulator to produce radiation such as light emerging from the plate with cyclically varying elliptical polarization for passage through a sample characterized as circularly dichroic, together with other means to detect differential absorbance (or transmittance) by the sample of left and right circularly polarized light passing through the sample.

These and other objects and advantages of the invention, as well as the details of an illustrative embodiment, will be more fully understood from the following detailed description of the drawings, in which:

FIG. 2 is a schematic showing of a system incorporating the strain birefringence modulator, for measuring circular dichroism of a test sample;

FIG. 3 is a view showing frame mounting of a modulator incorporating the invention;

FIG. 4 is an enlarged section taken on line 4—4 of FIG. 3;

FIG. 4a is a modified form of FIG. 4; and

Figure 1:
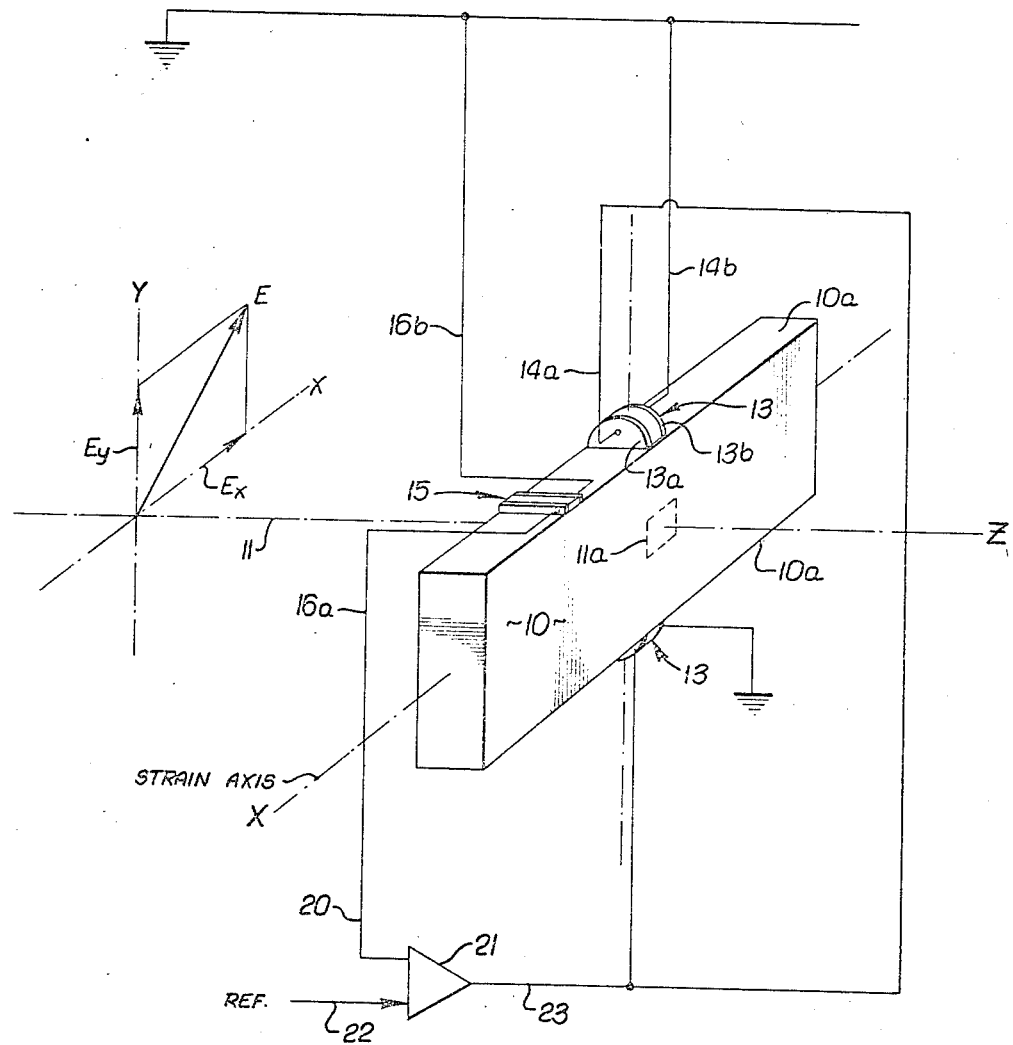
FIG. 1 is a perspective showing of a modulator incorporating the invention.

Referring first to FIG. 1, the modulator illustrated comprises a body, as for example plate 10, adapted to pass electromagnetic radiation directed thereto along a predetermined path, say path 11 along the Z axis. The body or plate is characterized as becoming optically plane birefringent, meaning that plane polarized light which enters the material of the body emerges therefrom elliptically polarized, with the major axis of ellipticity in general rotated about the optical path "Z" relative to the initial polarization plane. In the instant device, however, there is no such rotation, because of the 45 degree relation explained below. FIG. 1 shows the electric vector E of plane polarized light incident upon the plate, the vector having component $E_x$ lying in the direction of strain axis X of the plate 10, and component $E_y$ extending normal to component $E_x$. Also, E extends at a 45 degree angle to each of the axes X and Y. Under these conditions the phase difference between the $E_x$ and $E_y$ component waves emergent from the plate can be made to vary cyclically by applying to the plate a cyclically varying anisotropy, so that the degree of elliptical polarization of emergent light will vary between plus and minus values. The 45 degree orientation constitutes a special case, in which the plane-birefringent plate only produces ellipticity, and does not introduce rotation. In this regard, the transparent plate, which may typically consist of fused silica or Suprasil, may be subjected to cyclically varying anisotropy of appropriate character by cyclicallf stressing the plate along its X or strain axis, as indicated in FIG. 1.

For the above purpose, the modulator may also be considered to incorporate drive structure connected in mechanical oscillation transmitting relation to the body to effect body vibration along the X or strain axis. The transducer form of drive structure in FIG. 1 includes suitable piezoelectric elements 13 attached to the plate opposite edges 10a at center nodal points, i.e. half way along the X-axis dimension of the plate. Merely by way of example, the drivers may consist of barium titanate, being about .125 inch thick, .200 inch wide (i.e. the same as the plate thickness) and about .250 inch long. They may be cut from commercial grade piezoelectric material known as "PZT-4," a product of the Clevite Corporation.

The drivers have opposed conductive coatings 13a and 13b to which electrical connections are made at 14a and 14b to transmit the activating signals to the drivers, thereby to cause the plate to vibrate resonantly along the X-axis or plate length (strain) dimension. With a sinusoidal drive signal input, the sinusoidal strain which the plate undergoes makes the plate become plane birefringent, with the magnitude and sign of the birefringence varying sinusoidally in time. If the plate dimensions are fairly large in relation to the optical beam width dimensions, the strain and hence birefringence are quite homogeneous over the small cross section 11a intersected by the beam path 11. See for example the FIG. 3 broken line curves 80 and 81 illustrating instantaneous maximum stress distribution along the length of the plate 10. Curves 82 and 83 illustrate maximum longitudinal displacement undergone by the plate. For suitable attachment of the drivers to the plate edge without adverse damping of the piezoelectric, a product of Minnesota Mining & Manufacturing Company known as Scotch Weld, No. 2216B4A, lot 4ESC, cured at 55° C. for two hours, performed satisfactorily.

The invention also contemplates the provision of feedback, as exemplified by control means responsive to body vibration to transmit electrical oscillations to the driver so as to maintain substantially constant the peak retardation (in waves) introduced by the modulator plate, the latter preferably vibrating longitudinally at its fundamental resonant frequency. Such a control means typically includes a sensor or pickup connected to sense magnitude and phase of plate vibration, and may for example comprise a piezoelectric element 15 attached to the plate proximate its edge 10a as seen in FIG. 1. The sensor may also consist of "PZT-4" as identified above, .020 inch thick, and glued to the plate edge 10a near one of the nodally mounted drivers. Like the driver, the sensor has opposed conductive coatings to which electrical connections 16a and 16b are made, and the sensor and driver may have their long dimensions perpendicular to the long dimension of the plate 10, as illustrated, or alternatively, parallel to the long dimension. For this purpose, a silica plate measuring 0.2 inch thick, 1.5 inches wide and 2.5 inches long, mechanically resonant lengthwise at about 44.4 kilocycles per second, may be driven by about 25 volts RMS input to the described piezoelectric driver system.

FIGS. 3 and 4 show the drivers 13 connected at 17 to a holder in the form of a rectangular metallic frame 18 containing a central rectangular opening 19 receiving the plate 10. Thus, mechanical damping of or loading on the resonant plate is kept at a minimum, the plate being mounted via the drivers. The frame has reflector surfaces 18a facing opposite ends of the plate 10 and angled to reflect away from the plate acoustic energy transmitted toward those surfaces by the plate ends, thereby to minimize destructive acoustic loading at the plate ends. Other means of frustrating end reflected energy include a surface 18b as seen in FIG. 4a adapted to absorb energy, or spaced from the end 10b of the plate so as to provide phase cancellation.

The output of the pickup 15 is shown in FIG. 1 as transmitted at 20 to an amplifier 21 for comparison with a reference voltage transmitted to the amplifier at 22. The amplifier comparison output at 23 to the driver terminal 14a adjusts the drive amplitude so as to maintain the peak strain of each cycle of vibration of the plate at predetermined values dependent on other operating conditions, as described elsewhere herein. The phase of the signal transmitted at 20 by the pickup is such as to provide the necessary feedback conditions for plate oscillation. Accordingly, the plate itself continuously controls the magnitude and phase of the driving voltage to maintain resonant oscillation even though the natural resonant frequency may vary due to causes that include temperature change and aging.

FIG. 2 illustrates the use of the FIG. 1 plate in a system for measuring circular dichroism of a sample 25. The element 26 designated "light source" emits electromagnetic radiation as a continuum over a relatively broad range of wavelengths, which may be in the visible, infrared and/or ultraviolet portions of the electromagnetic spectrum. The term "light" will be used to designate any of such radiation. The monochromator 27 has the function of selecting from this continuum a relatively narrow band of wavelengths for use in measuring the circular dichroism of the sample, as is known. Depending upon the application, the monochromator may be a relatively coarse apparatus, or a fine high-resolution device such as that employed in the Model 15 Automatic Recording Spectrophotometer produced by Cary Instruments, Monrovia, California. A scan drive 28 may be coupled at 45 and 28a to the monochromator to cause it to sequentially select different narrow wavelength bands of radiation for transmission at 29, the arrangement being such that the nominal or central wavelengths of the selected bands form the locus of a smoothly varying function of time—a monotonic function—of approximately constant slope.

From the beam 29 leaving the monochromator, a substantially plane polarized component is selected by the polarizer element 30 and transmitted at 31 as the ordinary beam, the extraordinary beam being suitably eliminated. See in this regard the Model 60 spectropolarimeter, an apparatus manufactured by Cary Instruments, as well as the article "Circular Dichroism Theory and Instrumentation," by Abu-Shumays and Duffield, Analytical Chemistry, vol. 38, June 1966.

Plane polarized light at 31 is incident upon the vibrating modulator 32, of the construction seen in FIG. 1, so that light leaving the modulator at 33 is in general elliptically polarized, i.e. having electric and magnetic vectors each of whose tips describes an ellipse, in time, when projected onto a plane perpendicular to the direction of light propagation. Such light may be considered equivalent to two counter-rotating circularly polarized components vectorially added, the relative magnitudes of the two components determining the magnitude of the ellipticity. The algebraic sign of the ellipticity is determined by the direction of rotation of the resultant vector, i.e. by the "sense" of the larger circularly polarized component.

Light leaving the modulator at 33 is incident upon the sample 25, which absorbs unequally the circularly polarized components of opposite "sense," so that, as the ellipticity periodcally changes sign, the total amount of light incident on the phototube undergoes a corresponding periodic variation, i.e. larger when the light passing through the sample possesses a circularly polarized component of the sense absorbed to lesser degree by the sample, and smaller when the circularly polarized component is of the sense absorbed to greater degree by the sample.

A phototube 34 receives both fluctuating and steady (or constant) components of light flux transmitted from the sample at 35 so that the current output of the tube contains both fluctuating and DC components. The fluctuating component is approximately sinusoidal AC, of frequency equal to the fundamental frequency of the modulator plate and odd harmonics thereof and corresponding in magnitude to the difference between the transmission levels for the circularly polarized components of opposite sense. There may also be small relatively insignificant AC current components due to parasitic vibration of the plate 10, at frequencies other than the plate fundamental frequency. The DC component corresponds in magnitude to the average or mean transmission of the sample for light in general, at the wavelength of interest.

The phototube output at 36 is fed to readout electronic circuitry 37, which may be comparable to that described in U.S. Patent 3,257,894 to Grosjean, with the exception that the carrier frequency is the fundamental mechanical vibratory frequency of the modulator plate 10 rather than the frequency of the AC driving signal applied to the electro-optic modulator. A synchronizing input signal to circuitry 37 is shown as derived at 38 from the amplifier 21 whose output at 23 controls the piezoelectric driver 13, for use in a detector embodied in block 37 to derive a detected version $I_1$ of the AC output component from tube 34. The readout circuitry also derives the ratio of $I_1$ to $I_2$, the latter being a version of the DC output component from tube 34. The value of that ratio is very nearly proportional to the actual value of circular dichroism of the sample, as indicated by the following analysis:

$$CD \equiv A_L - A_R \tag{1}$$

where $A_L$ and $A_R$ are respectively the sample absorbances for left and right circularly polarized light. These absorbances are related to the transmittances of the sample for left and right circularly polarized light, as follows:

$$A_L = \log_{10}\left(\frac{1}{T_L}\right) \tag{2}$$

$$A_R = \log_{10}\left(\frac{1}{T_R}\right) \tag{3}$$

By substitution into Equation 1, $$CD \equiv \log_{10}\left(\frac{T_R}{T_L}\right) \tag{4}$$

Expansion of the Equation 4 logarithm shows that the circular dichroism is approximately proportional to the ratio:

$$\frac{T_R - T_L}{\frac{1}{2}(T_R + T_L)} \tag{5}$$

which ratio is a version of the ratio $I_1/I_2$ referred to above.

An output signal at 39 from the readout 37, and proportional to $I_1/I_2$, is fed to the actuator 40 controlling the position of an ink pen 41a of a strip chart recorder 41, thereby to record a value which is an excellent approximation to circular dichroism of the sample. The scan drive motor 28 referred to above also drives a platen 42 translating the chart paper 43 in a direction 44 normal to the motion of the recording pen, so that the position of the pen longitudinally along the chart paper is a continuous known function of wavelength. Thus, an ink tracing of circular dichroism vs. wavelength is produced. The scan drive output 45 also actuates a control 46 operating to program a variation of the reference voltage 47 transmitted at 22 as described above, thereby to compensate for wavelength variations in the stress-optic coefficient $C_\lambda$ of the modulator plate, $C_\lambda$ being mathematically defined below. Thus, the correct amount of birefringence is imparted to the modulator plate 10 in relation to the wavelength of beam 31, for maintenance of the precise required elliptical polarization of beam 33.

Relative insensitivity to beam divergence and azimuth of the retardation produced by the modulator of the present invention offers considerable operating improvement over prior modulators. In this regard, stress-induced retardation $\delta$ for a plate subjected to a uniform longitudinal stress may be represented as:

$$\delta = C_\lambda S t \tag{6}$$

where $C_\lambda$=stress-optic coefficient at wavelength $\lambda$
$S$=stress (force per unit area)
$t$=plate thickness For example, for $\lambda = 5461$ A., a quarter-wave retardation plate may be obtained by applying a longitudinal uniaxial stress of about 870 lb./sq. in to a ¼ in. thick silica plate.

The following table represents the percentage variation of the retardation of a ray incident on the plate at angle $\phi$ to the normal, due to the longer path length $L\phi$ of travel of the oblique ray, relative to the path length $L_{normal}$ of a normally incident ray (approximation good for relative small angles):

| $\phi$ | Percent variation $=100\left(\dfrac{L\phi}{L_{NORMAL}}\right)-1$ |
|---|---|
| 1° | 0.006 |
| 2° | 0.025 |
| 5° | 0.158 |
| 10° | 0.631 |
| 15° | 1.42 |

By contrast with the above negligible variation in the retardation, even for obliquely incident rays, the electro-optic modulator commonly used in the prior art, as mentioned in the introduction, shows retardations which vary strongly and in a complicated way with the amount of divergence, and also with the angle which the projection of the incident ray on the plane of the face of the modulator makes with any set of reference coordinates fixed in that plane. For instance, a ray incident on an electro-optic modulator, described earlier, and whose projection on the face of the modulator makes an angle of about 4° with the normal to that face, may have any retardation between 0 and 90 degrees, depending on its orientation relative to the crystallographic and induced axes in the modulator, when the modulator is subjected to a voltage that will induce 90° retardation to normally incident rays.

Figure 5:
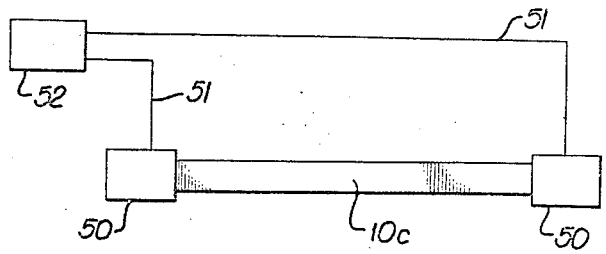
FIG. 5 is an edge view of a modulator plate driven electromagnetically.

FIG. 5 shows a modification of the invention wherein a plate 10c, the same as plate 10, is driven by structure 50. The latter comprises electromagnetic actuators or drivers to which alternating current is supplied at 51 from a source 52, drive energy being transmitted to the plate at its longitudinally opposite ends.

We claim:
1. Apparatus for measuring a polarization characteristic of specimens, comprising:
a source of plane-polarized monochromatic light;
a variable birefringence device, disposed for passage therethrough of said light, and comprising a solid body characterized as becoming optically plane birefringent under mechanical stress, and driver structure connected in mechanical oscillation transmitting relation to said body to effect body vibration at a natural frequency of the body, whereby the body is made cyclically plane-birefringent; and whereby said light emerges from said body with cyclically varying polarization, said structure being attached to said body;
means defining a zone for receiving and supporting such a specimen for passage therethrough of said emergent light;
photosensitive means, disposed to receive said light after passage through said zone, for deriving in response to said light a measure of the said characteristic of any such specimen placed in said zone; and other means responsive to said photosensitive means for processing and recording said measure for interpretation of such characteristic.

2. The apparatus of claim 1, comprising feedback means responsive to said body vibration for controlling said driver structure to maintain the body in self-resonant vibration at said natural frequency.

3. The apparatus of claim 1 wherein said source includes a monochromator and directs light for travel through the body during said vibration thereof.

4. The apparatus of claim 1, in which said body comprises a plate oriented to receive light incident upon a major face of the body, said driver structure being located proximate the plate edge to drive the plate.

5. The apparatus of claim 4, in which the plate is elongated and said structure is located to effect mechanical vibration of the plate in a longitudinal mode.

6. The apparatus of claim 5, in which said structure comprises piezoelectric drivers attached to the plate at nodal points spaced from the longitudinally spaced ends of the plate.

7. The appratus of claim 5, in which said driver structure comprises an electromagnetically excited mechanical actuator located at a longitudinal end of the body.

8. The appratus of claim 5, including a frame supporting said plate for vibration, and having means for frustrating destructive reflections of acoustic energy radiated outwardly from the plate.

9. The apparatus of claim 2, wherein said feedback means includes control means responsive to body vibration to transmit electrical oscillations to said drive structure so as to maintain the peak strain in the body at predetermined levels.

10. The apparatus of claim 9, in which said control means includes an electro-mechanical sensor connected mechanically to said body to produce an electrical output in response to variable strain transmitted from the body to the sensor during said vibration.

11. The apparatus of claim 10, in which said sensor comprises a piezoelectric element attached to the body proximate the edge thereof.

12. The apparatus of claim 10, in which said control means includes a reference signal source, and means to compare the sensor electrical output with the reference signal and to produce a drive signal output transmitted to the driver structure.

13. The apparatus of claim 1, in which said body consists essentially of fused silica.

14. The apparatus of claim 4, in which said plate consists essentially of fused silica.

15. The apparatus of claim 1 wherein said photosensitive means includes a radiation intensity sensitive element and functions to detect differential absorbance by such specimen of left and right circularly polarized radiation passing through such specimen.

16. The combination according to claim 15, in which said element is in the path of the radiation emergent from the sample to produce an output signal varying in accordance with the difference between radiation transmission levels corresponding to circularly polarized radiation components of left and right sense.

17. The combination of claim 16, in which said other means includes readout circuitry to derive a detected version of the output signal of said element.

18. Apparatus for the measurement of circular dichroism, comprising in combination, a body characterized as becoming optically plane birefringent under mechanical stress, driver structure connected in mechanical oscillation transmitting relation to said body to effect body vibration whereby the body is made cyclically plane birefringent, means to direct electromagnetic radiation to travel through the body during said vibration thereof and which emerges from the body with cyclically varying elliptical polarization for passage through a sample characterized as circularly dichroic, and other means to detect, process and display for interpretation by a human operator differential absorbance by the sample of left and right circularly polarized radiation passing through the sample.

19. The combination of claim 18, including feedback means responsive to said vibration for controlling said driver structure to maintain body vibration characterized by a constant peak level of relative retardation as between orthogonally polarized components of said radiation traveling through the body.

20. The combination of claim 18, in which said last named means includes a radiation intensity sensing element in the path of the radiation emergent from the sample to produce an output signal varying in accordance with the difference between radiation transmission levels corresponding to circularly polarized radiation component of left and right sense.

21. Apparatus for measuring a polarization characteristic, comprising:
a body characterized as optically plane birefringent under mechanical stress;
objects attached to said body, and forming therewith a vibratory system;
driver structure connected in mechanical oscillation transmitting relation to said vibratory system, to effect vibration of said body and objects at a natural frequency of said system, whereby said body is made cyclically plane birefringent;
means for operating said system as a polarization modulator for light to be passed through a specimen to a photodetector, whereby the time variation of an output signal of such photodetector is related to the said characteristic of such specimen; and
display means responsive to said output signal to record the said characteristic of such specimen.

References Cited

UNITED STATES PATENTS

| 2,064,289 | 12/1936 | Cady | 250—201 |
| 2,287,587 | 6/1942 | Willard | 350—161 |
| 2,392,350 | 1/1946 | Willard | 350—161 |
| 3,328,110 | 6/1967 | Berger et al. | 350—151 |

RONALD L. WIBERT, Primary Examiner

T. R. MOHR, Assistant Examiner

U.S. Cl. X.R.

350—151